US007936872B2

(12) United States Patent
Krumm et al.

(10) Patent No.: US 7,936,872 B2
(45) Date of Patent: May 3, 2011

(54) CLIENT PROXIMITY DETECTION METHOD AND SYSTEM

(75) Inventors: John C. Krumm, Redmond, WA (US); Susan D. Woolf, Seattle, WA (US); Roland Fernandez, Woodinville, WA (US); David J. Marsh, Sammamish, WA (US); Albert D. Jee, Sammamish, WA (US); Wayne G. King, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 924 days.

(21) Appl. No.: 10/677,125

(22) Filed: Sep. 30, 2003

(65) Prior Publication Data

US 2004/0236850 A1    Nov. 25, 2004

Related U.S. Application Data

(60) Provisional application No. 60/471,982, filed on May 19, 2003.

(51) Int. Cl.
   *H04K 1/10* (2006.01)
(52) U.S. Cl. ........ 380/34; 380/270; 380/247; 455/456.1; 455/424; 370/913; 709/224
(58) Field of Classification Search .................. 380/34, 380/247
   See application file for complete search history.

(56) References Cited

U.S. PATENT DOCUMENTS

| 5,430,761 | A * | 7/1995 | Bruckert et al. | 375/144 |
|---|---|---|---|---|
| 5,950,133 | A | 9/1999 | Bledsoe | |
| 6,799,047 | B1 * | 9/2004 | Bahl et al. | 455/456.1 |
| 6,978,023 | B2 * | 12/2005 | Dacosta | 380/258 |
| 7,129,891 | B2 * | 10/2006 | Meunier | 342/463 |
| 7,149,533 | B2 | 12/2006 | Laird et al. | |
| 7,206,934 | B2 | 4/2007 | Pabla | |

(Continued)

FOREIGN PATENT DOCUMENTS

GB    2329801    3/1999

(Continued)

OTHER PUBLICATIONS

Krumm NPL Reference Krumm J. et all "RightSPOT: A Novel Sense of Location for a Small Personal Object" Lecture Notes in Computer Science Springer Verlag, New York, NY US vol. 2864, Oct. 12, 2003, pp. 36-43, XP002304129 ISSN: 0302-9743, p. 38, line 22—p. 40, line 6.

(Continued)

*Primary Examiner* — Nasser Moazzami
*Assistant Examiner* — Fikremariam Yalew
(74) *Attorney, Agent, or Firm* — Workman Nydegger (57) ABSTRACT

A system and method in a wireless network for discovering which resources (e.g., other wireless computing devices) are proximate a user's wireless computing device. Wireless signal strengths with respect to various base stations are compared with the signal strengths of other network devices or resources, to determine which devices are experiencing similar signal strengths. Devices with similar signal strengths are deemed proximate. Each participating computing device may send its signal strength reports to a proximity server, which distributes proximity data to network clients. Each client may receive and process the signal strength data for determining which other clients/resources are proximate, or the server can perform proximity computations and return a list of proximate clients. Once computed, the identities of the proximate clients can be used to query for additional data about the clients, such as the names and other details of their owners, or information about the resource.

36 Claims, 6 Drawing Sheets

U.S. PATENT DOCUMENTS

| | | | |
|---|---|---|---|
| 2001/0016490 A1* | 8/2001 | Martin-Leon et al. | 455/424 |
| 2002/0095486 A1 | 7/2002 | Bahl | |
| 2003/0220116 A1* | 11/2003 | Sagefalk et al. | 455/456.1 |
| 2003/0229445 A1 | 12/2003 | Tingley | |
| 2003/0232598 A1 | 12/2003 | Aljadeff | |
| 2004/0009750 A1* | 1/2004 | Beros et al. | 455/41.2 |
| 2004/0072577 A1 | 4/2004 | Myllymaki | |
| 2004/0263388 A1 | 12/2004 | Krumm | |
| 2005/0075116 A1* | 4/2005 | Laird et al. | 455/456.3 |
| 2005/0124355 A1* | 6/2005 | Cromer et al. | 455/456.5 |
| 2005/0185615 A1 | 8/2005 | Zegelin | |
| 2005/0233748 A1 | 10/2005 | Robinson | |

FOREIGN PATENT DOCUMENTS

| | | |
|---|---|---|
| WO | WO 01/28272 | 4/2001 |

OTHER PUBLICATIONS

EPO Search Report NPL Reference European Search Report which corresponds to US patent application.

Office Action mailed Apr. 10, 2007 cited in related U.S. Appl. No. 10/880,051.

Office Action mailed Dec. 17, 2007 in related U.S. Appl. No. 10/880,051.

Office Action mailed Apr. 2, 2008 in related U.S. Appl. No. 10/880,051.

Office Action dated Sep. 12, 2008 cited in U.S. Appl. No. 10/880,051.

Notice of Allowance dated Dec. 11, 2008 cited in U.S. Appl. No. 10/880,051.

US 6,731,928, 05/2004, Tanak (withdrawn)

* cited by examiner

CLIENT PROXIMITY DETECTION METHOD AND SYSTEM

CROSS-REFERENCE TO RELATED APPLICATION

The present invention claims priority to U.S. provisional patent application Ser. No. 60/471,982, filed May 19, 2003 and herein incorporated by reference.

FIELD OF THE INVENTION

The invention relates generally to computer systems and networks, and more particularly to computer systems employing wireless communications.

BACKGROUND OF THE INVENTION

When in unfamiliar settings, it would be very useful for a person to be able to automatically discover who else was nearby, and also what other resources were near that person. For example, at conferences, meetings and other social engagements, people interact with one another fairly regularly, and often see the same people at many such events. One of the most awkward and difficult things that occurs for an individual is to see someone that he or she should know fairly well from a previous encounter, yet be unable to remember the name and other details of that person. Some people may go so far as to attempt to avoid such a person until they can recall at least the name, or otherwise find out who that person is.

In addition to discovering other people, many individuals would benefit from being able to discover other resources that are nearby. For example, a user of a mobile computing device may need to print a document, such as when out of the office, and would thus benefit from being able to detect the nearest available printer. As another example, a user may misplace a mobile computing device, such as by leaving a pocket-sized digital assistant in someone else's office or under a pile of papers, and would benefit from being able to discover the location of the misplaced device. As other examples, a person may want to find the nearest elevator, bathroom, or vending machine, even though these devices are not part of any computer network.

What is needed is a way for a user of a computing device to be able to detect or otherwise discover people and other resources that are nearby the user's computing device. The method and system should be reliable, flexible, and extensible, as well as easy to use and understand for even non-sophisticated computer users.

SUMMARY OF THE INVENTION

Briefly, the present invention provides a system and method in a wireless network for discovering via a network-capable device (such as a computing device) which other wireless network devices and other transmitters of network information are proximate the network device. With this information, information about another resource (e.g., biographical data about a computing device's owner, or its device capabilities and/or location) may be looked up or otherwise provided to a network device for presentation to a user of that device.

To discover which other resources such as wireless network devices are proximate, the system and method gather wireless signal strengths (with respect to various base stations, or access points or the like) from participating resources such as network devices, and then compare those signal strengths to determine which devices are experiencing similar signal strengths. Those with similar signal strengths are determined to be in proximity to one another.

In one implementation, each participating computing device (proximity client) is responsible for sending signal strength reports for the various base stations that it can see to a proximity server. A client can also optionally register with the server, supplying data such as a name string and an expiration time. In an alternative implementation, clients can provide signal strengths to one another in a peer-to-peer data exchange model. In a client-server model, the server can distribute (e.g., when queried or periodically) the signal strength information to the clients, or the server can perform computations to determine which participating clients are proximate any given client, as determined based on similar signal strength reports. A list of such other clients may be provided to each client, possibly including other information. For example, if the client does not compute proximity on its own, then the list can include information about the other clients such as biographical data of its associated user, or the client can otherwise obtain the information, such as by querying a database.

If the client does its own proximity computations, then the client queries the server (or other clients) for signal strength reports, or receives them in some other manner such as periodically, usually going back in time some limited amount. Once computed, the client list can be used as a basis for querying a database as needed to obtain additional data about the other clients, such as the names and other details of their owners, or information about the resource (e.g., a printer and its intended location, such as at an information booth).

A client can be set up to report its signal strengths and present lists of nearby clients on demand. The on-demand (manual) mode is useful for obtaining a one-time list of nearby users, for example at the beginning of a meeting. Alternatively, the client can be set up to perform the reporting function periodically (or on some occasional basis). Such a periodic mode is useful if users are frequently moving from place to place, when their signal strengths and proximity relations will also change frequently. The reporting can be some combination of these mechanisms, e.g., switch from an on-demand reporting mode to a periodic reporting mode when a client's own average signal strengths with respect to base stations start varying beyond some threshold, which would be indicative of the client moving.

In a client-server model, the proximity server collects signal strength data from each mobile client and distributes the signal strengths and/or proximity data (such as a list of clients) back to those mobile clients. The proximity server is a central computer that stores signal strength data reports contributed by the participating mobile proximity clients. In one implementation, each report comprises a set of ordered pairs, with each ordered pair giving a base station identifier and the signal strength from that base station as measured on the client. The proximity server tracks the data in association with the identity of the reporting mobile device, and adds a time stamp that indicates when the report was received.

Proximity clients may query data from the proximity server. For example, if a client performs its own proximity computations, then that client will request signal strength reports from the server, usually going back in time by an amount specified by the client. This "look back" time acts as a filter on the data so only recent signal strength data may be considered, as older data may have come from locations that the clients are no longer near. Other smoothing and filtering operations are feasible. Other clients, such as those that do not perform their own proximity computations, may request that the server send back a list of other nearby clients.

The proximity information, whether calculated from obtained signal strength data or obtained from the server, can be used to access one or more databases (e.g., a database of biographical data built during conference registration such as including a picture, name and facts), whereby information about a nearby individual or device is readily available to a participating client computer.

Proximity to non-networked or non-electronic resources such as stairways or bathrooms can be computed by representing each such device as a set of signal strengths in the database. These signal strengths are measured in a calibration step in which a user visits the resource's actual location while carrying a wireless device. The resource's signal strengths are measured with the wireless devices and reported to the database. In this way, any resource can be tagged with signal strengths and then participate in proximity queries.

Other advantages will become apparent from the following detailed description when taken in conjunction with the drawings, in which:

DETAILED DESCRIPTION

Exemplary Operating Environment

Figure 1:
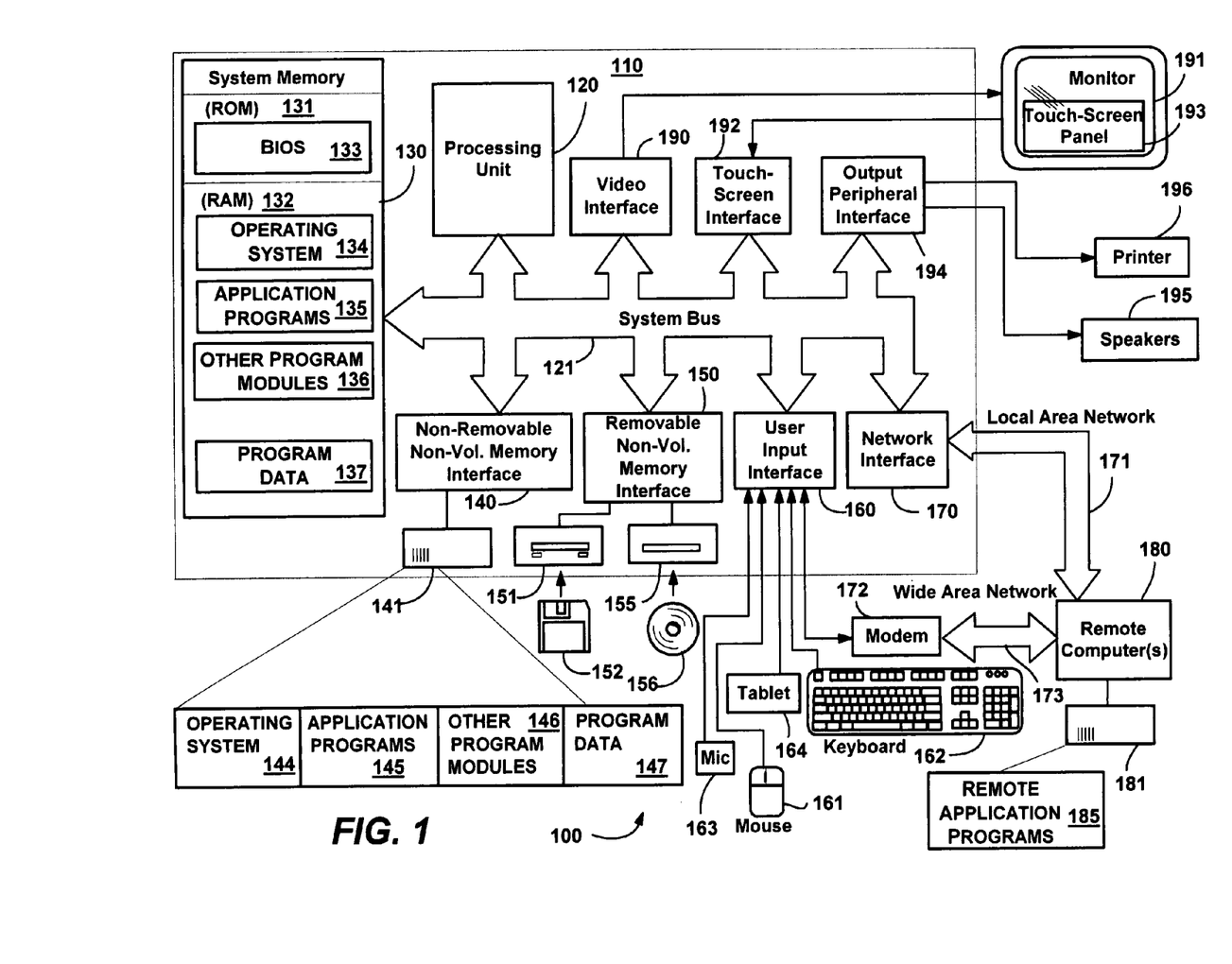
FIG. 1 is a block diagram generally representing a computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, that perform particular tasks or implement particular abstract data types. The invention may also be practiced in distributed computing environments where tasks are performed by remote processing devices that are linked through a communications network. In a distributed local and remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet (electronic digitizer) 164, a microphone 163, a keyboard 162 and pointing device 161, commonly referred to as mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel 193 or the like that can input digitized input such as handwriting into the computer system 110 via an interface, such as a touch-screen interface 192. Note that the monitor and/or touch screen panel can be physically coupled to a housing in which the computing device 110 is incorporated, such as in a tablet-type personal computer, wherein the touch screen panel 193 essentially serves as the tablet 164. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170, and particularly may include one configured for wireless networking. When used in a WAN networking environment, the computer 110 may also include a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Client Proximity Detection

The present invention, in part, directed towards a method and system that use radio signal strengths from a wireless computer network to estimate which other mobile, wireless devices (and possibly their owners) are in physical proximity. While the examples herein generally refer to mobile network devices in the form of portable computer systems such as tablet personal computers, it should be understood that virtually any device capable of transmitting information to a wireless network can participate in the proximity detection schemes described herein. Moreover, sources other than radio waves can be used to detect proximity of devices having suitable sensors, such as sound waves and light patterns. In general, anything that can be sensed by some mechanism that has characteristics local to some area may be used to compute (or help compute) proximity. Thus, although radio is primarily described herein, proximity detection based on the principles of the present invention may apply to many other concepts, and thus the term "network" need not be an actual computer network, the terms "signal" and "signal strength" are intended to encompass any sensed information that varies based on location, and "base station" or "base stations" represent any signal source or sources from which data can be sensed.

Moreover, participation need not be symmetrical, in that, for example, a device can transmit its signal strength data for proximity detection purposes without receiving similar data from other devices, in essence describing its location but not concerning itself with the location of other devices. Thus, for example, an individual can wear a small transmitting device that essentially announces the individual's location but does not process data related to detecting other devices in proximity. Conversely, a device can receive proximity-related data of other network devices without transmitting its signal strength data, however participation is generally desirable, as will be readily apparent. Also, for non-networked or non-electronic resources, the resource may be represented by a set of signal strengths that were measured only once in a calibration step. Note that as used herein, although much of the description exemplifies the use of wireless computing devices, the term "resource" includes the concept of such a wireless device and/or any other type of computing device, as well as some non-networked or even non-electronic devices. In general, a resource thus can be anything that has associated signal strength data, such as actual, current signal strength data of a mobile computing device, or pre-measured data stored for a fixed resource or the like.

Figure 2:
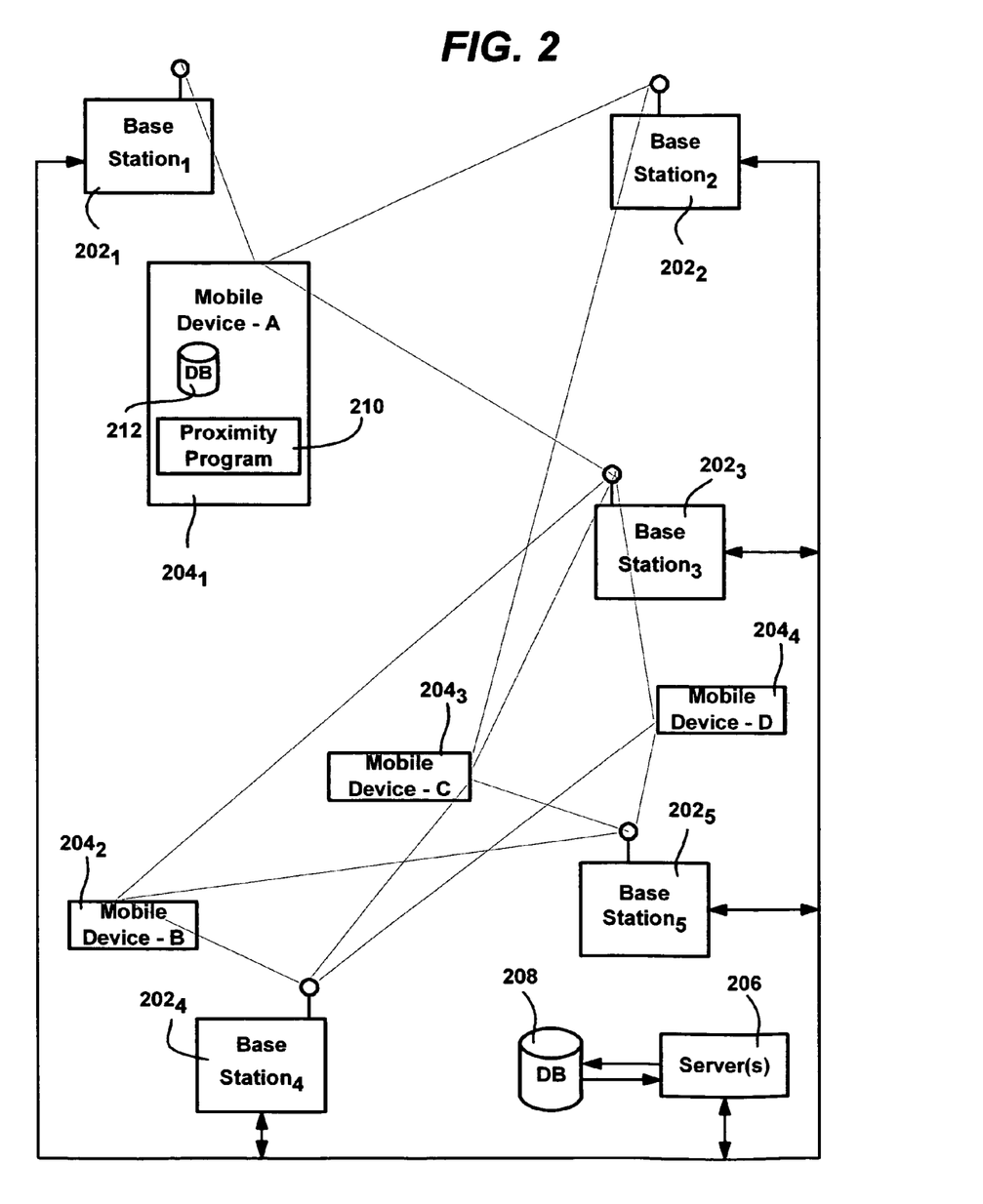
FIG. 2 is a block diagram generally representing a network, including a plurality of base stations having wireless connections to a plurality of network devices, configured to use signal strength data in accordance with an aspect of the present invention.

As generally represented in FIG. 2, a wireless network 200 is normally composed of multiple, statically mounted, wireless base stations (five are shown in FIG. 2, labeled $202_1$-$202_5$, although it is understood that any practical number may be present) that simultaneously communicate over radio frequencies to wireless devices (four are shown, $204_A$-$204_D$, which can again be any practical number) and over network cables with a wired network. When in range, each mobile device can "see" (receive signals from) one or more of these base stations, and measure the strength of the radio signal it is receiving from these base stations. This measurement is often referred to as "RSSI," for "Received Signal Strength Indicator." Note that the measured RSSI of a base station varies from place to place due to the natural attenuation of radio signals with distance as well as the reflection, refraction, diffraction, and attenuation caused by the physical environment, like walls, floors, ceilings, and furniture. Thus, the RSSI that a mobile device measures is sensitive to that device's location.

In one implementation, the present invention detects the proximity of two or more devices connected to a wireless network by examining the signal strengths that 802.11 clients measure from statically mounted 802.11 access points, (wherein 802.11 specifies well-known wireless communications standards based on IEEE 802.11 specifications). In general, when the signal strengths are similar enough, the clients are declared to be in proximity. Note that 802.11 coverage and the number of 802.11-enabled devices are becoming prevalent, and in such an environment the present invention enables 802.11 clients to see which other 802.11 clients are nearby, using the existing infrastructure. As will be understood, this detection enables a wide variety of applications, including automatically showing a list of nearby friends, displaying information about unknown people standing nearby in a social setting, advertising the proximity of nearby 802.11-connected devices, such as wireless printers, finding nearby resources, and so forth. Notwithstanding, the present invention is not limited to any particular applications, communications standards, frequencies, protocols or the like.

In general, an implementation of the present invention operates by comparing a pair of wireless network (e.g., Wi-Fi) client devices, (or simply clients). Each network device scans internally for a list of "visible" access points, and obtains the signal strengths from each of those access points. For example, in FIG. 2, the mobile device $204_1$ scans for and obtains the signal strengths for three access points, namely the base station $202_1$, the base station $202_2$ and the base station $202_3$. Each of the devices then transmits this data to a central server 206 (or set of servers) which compares the signal strengths and returns an inference on whether or not any two devices are in proximity. When there are more than two clients, the server compares each possible pair of clients to produce a proximity inference for each pair. After the server has made proximity inferences, it transmits a list of proximal clients to each client. Alternatively, the central server can provide signal strength data to the clients, which can then perform their own proximity calculations. As can be readily appreciated, other alternatives, such as a peer-to-peer model which needs no base stations and no server by considering peers with the strongest signals to be the closest, are also capable of enabling proximity detection in accordance with the present invention.

To determine the signal strengths, the clients (e.g., $204_1$-$204_4$) each assemble an array of MAC addresses, one unique address for each access point seen. Each client also assembles a corresponding array of signal strengths from each of the visible access points. In the client-server model, these arrays are transmitted by each of the clients to the server 206. For any two clients, the server 206 may compare the arrays, to extract which access points the two clients can see in common, as described below. The list of access points seen in common is often a subset of each client's visible list, because often the two clients cannot see the exact same set of access points. The server 206 may then construct a numerical proximity score based on the signal strengths of the access points that both clients can see. For example, this score may be the sum of squared differences of the corresponding signal strength pairs divided by the number of access points seen in common. In other words, it is the average squared signal strength difference over the list of common access points. If this score is below a threshold, the clients are inferred to be in proximity, otherwise they are inferred to be apart. As described below, various other mathematical techniques for determining proximity may be alternatively employed.

To help smooth dropouts and extremes in the signal strength values, rather than use raw values, the server may instead compare median values of signal strengths taken over time. Note that signal strength samples from access points may vary considerably even when the client location is constant. Averaging the samples over time or employing median filtering helps obtain a reliable figure for the signal strength. In one implementation, the client can perform this function, and report smoothed values to the server, however the server can also perform its own smoothing operations.

One threshold that the server may use is a function of the number of access points seen in common. In general, the threshold is higher for more access points. This enforces the intuitive notion that when only a few access points are seen in common, the average difference in signal strengths should be small in order to declare proximity. If many access points are seen in common, then the clients are likely in proximity even if the average signal strength difference is larger. This works particularly well in environments with low-power access points, such as generally represented in the network 300 of FIG. 3, (in which generally similar components have like numbers relative to those of FIG. 2) in which a wireless network device needs to be fairly close to a base station in order to receive its signals. In one actual embodiment, low-power base stations were deployed to reduce the range, and the proximity detection was very accurate simply based on which base stations devices saw in common. As shown in the simplified example of FIG. 3, only mobile device-A and mobile device-B have more than one base station in common; whether the other devices are considered proximate depends on thresholds set for that particular environment and/or other criteria such as how strong is a signal to a common base station.

Note that in practice, the thresholds have been successfully derived from training data. In general, the training participants walk around a room or other appropriate area while running a program that records signal strengths from visible access points. As part of training, the participants also indicate which other participants they are close to in actuality. In an offline process, this data is analyzed to find the thresholds that tend to maximize the number of correct proximity inferences as a function of the thresholds. These are the thresholds that are used for making subsequent inferences on the server. Of course, different environments may have different training results and thus different thresholds.

To detect signal strengths, passive or active scanning may be employed. Passive scanning involves the client tuning to a channel and listening for a period of time for valid 802.11 packets received from the base stations (access points) on that channel. The packets received are usually Beacons from the base stations at 100 msecond intervals, but this period cannot be guaranteed. Active scanning involves the client tuning to a channel and sending a Probe request with an SSID equal to the broadcast SSID or SSID equal to a valid SSID. A base station that receives a Probe Request with an SSID equal to the broadcast SSID or SSID equal to its own SSID will respond to the client with a Probe Response.

A proximity client may scan (actively or passively) all 802.11 channels to determine the RSSI of base stations on those channels. Alternatively, a proximity client may scan (actively or passively) a subset of channels for a specified minimum and maximum durations to optimize performance and reduce the adverse impact to the client. Note that these two methods may be used in conjunction to improve performance. For example, all-channel scanning may be performed on a regular basis for roaming purposes (e.g., Windows® XP and Windows® Zero Config operates in this manner). Then, the results can be used to determine the active subset of channels for subset scanning, with the frequency of subset scanning being greater than the frequency of all-channel scanning.

In one example, the number of channels scanned by the client was reduced to only the channels of interest. This was done to improve the performance of the overall system and the proximity client which was actively associated to a valid network.

Thus, in sum, in accordance with an aspect of the present invention, wireless signal strengths are gathered from each of the participating mobile devices $204_A$-$204_D$, and then compared (e.g., in pairs) to find which devices see similar signal strengths. Those with similar signal strengths are declared to be in proximity.

As described above, in one implementation, the system and method includes a central proximity server (or set of communicating servers) 206 used to collect signal strength data and to distribute signal strength and/or proximity data to the mobile clients $204_A$-$204_D$. In this model, at least some of the mobile proximity clients that participate in proximity detection send signal strength data to the central server 206, and query the server 206 for signal strength and/or proximity data. A database 208 is also shown, so that, for example, information beyond simply device identifier, strengths and/or lists may be provided to clients, such as biographical data (e.g., images and text) for a user of each device; furthermore this database could allow performance of additional queries such as common or differing profile elements.

Other variations are feasible, including using proximity detection as an "alert" for the user, e.g., a user who is walking thru a city and wants to know when he or she gets near a certain type of store or restaurant, and the user's device can provide such a notification. Also, the present invention can provide an alert when someone who shares one or more of a user's interests or has a service/good that is being sought is nearby, (e.g., in a conference, commerce, or social setting).

The proximity server 206 comprises a central computer used to store signal strength data contributed by participating mobile proximity clients, e.g., the clients $240_A$-$204_D$ in FIG. 2. The server stores each signal strength report as it comes in, such as in a cache and/or non-volatile storage. As described below, each report comprises a set of ordered pairs, with each ordered pair giving a base station identifier $b_j$ and the measured signal strength $s_j$ measured from that base station on the client. Mathematically, the proximity server receives reports of the type:

$[(b_1, s_1), (b_2, s_2), \ldots, (b_m, s_m)]$

In this example, the mobile device reports that it can see m different base stations, and reports the base station identifier along with the measured signal strength of each base station as a set of pairs. The proximity server appends a client identifier $c_i$ indicating the identity of the reporting mobile device and a time stamp $t_i$ indicating when the report was received to this data.

The proximity server can optionally maintain a list of registered users of the service. Each user is given a client identifier $c_i$ (used as described above), a name string to make the list of proximal users easier to interpret, and optionally an expiration time after which the user is automatically deleted from the list of registered users and will not appear on any more lists of nearby resources/people. This helps ensure privacy after users are finished with the system.

Proximity clients query data from the proximity server, although alternatively the server may use a broadcast or other push model to provide the data, e.g., on some regular basis. If a client device performs its own proximity computations, then that device need request only the signal strength reports from the server 206, usually going back in time by some limited amount specified by the client. This "look back" time acts as a filter on the data so that only recent signal strength data will be considered, and also to reduce the amount of data that needs to be transmitted through the network 200. Note that older data may have come from locations that other clients have already left.

Alternatively, if the clients do not perform their own proximity computations, they may request that the server 206 send back a list of other nearby clients. In essence, the server performs the computation for such clients. The computation is explained below. Note that it is possible to have a mixed-type system in which some clients perform their own computations while other clients receive the computed list of other nearby clients from the server. For example, more sophisticated devices can perform the computations to relieve some of the load on the server, while the server can perform the computations for less-capable devices.

In accordance with an aspect of the present invention, proximity clients (at least those that wish to be located by others) are responsible for sending signal strength reports to the proximity server 206. Proximity clients can also optionally register with the server, such as to supply a name string and an expiration time. As described above, if the client does its own proximity computations, then it queries the server for signal strength reports, usually going back in time a limited amount, and can further report its results to the server 206. For example, the client can provide the server with a list a list of nearby users. This data can also be used by the server to deduce or further process proximity information, e.g., if client A is reporting that clients B and client C are both nearby, then the server knows that client B is at least somewhat close to client C. As can be appreciated, the larger the lists, the more the server can deduce.

A client can be set up to report signal strengths and give lists of nearby users on demand. Alternatively, the client can be set up to perform either function periodically. The periodic mode is useful if users are frequently moving from place to place, when their signal strengths and proximity relations will also change frequently. The on-demand mode is typically more useful for getting a one-time list of nearby users, such as at the beginning of a meeting. Modes may be switched manually by the user, but may also be set to switch automatically. For example, if a device detects its signal strengths changing, the device can automatically switch to the periodic mode, while if the device detects relatively static signal strengths, the device can switch to the on-demand mode. Note that instead of immediately switching to the on-demand mode when signal strengths are sufficiently static, the reporting period can be gradually increased until the device essentially achieves the on-demand mode.

In accordance with an aspect of the present invention, proximity is thus determined by comparing signal strength reports between pairs of proximity clients. In general, the greater the similarity in reports, the more likely two clients are nearby.

Various numerical features for determining proximity may be employed, as described below. Note that for each of these features, the signal strength reports from a given client are normally smoothed in some way prior to the feature computation. For example, smoothing may be accomplished by taking a client's signal strength data back in time some pre-specified amount, from a few seconds to a few minutes. The look back time should be shorter if the client is likely moving around frequently, to avoid smoothing reports from different locations. Given the set of recent reports, the smoothed report has one (base station identifier, signal strength) pair for each base station seen in the set. The signal strength associated with each base station is taken as the mean or median of the signal strengths measured from that base station in the set.

A straightforward indication of proximity is the number of base stations that two clients see in common. The more base stations in common indicate a greater likelihood of proximity. By way of example, in FIG. 2, the mobile device A can see only one base station (base station$_3$) in common with the mobile device B, mobile device C, and mobile device D, and thus in such a model is not likely in proximity with those other clients. In contrast, the mobile device B, mobile device C, and mobile device D each commonly see the same three base stations (base station$_3$, base station$_4$ and base station$_5$) and thus are more likely to be proximate one another. In general, for clients k and l, the number of base stations that both can see may be referred to as $n_{k,l}$.

If two clients are at the same location, their signal strengths are expected to be similar. The aggregate difference in signal strengths can be quantified using a sum of squared differences. To this end, the list of access points that two clients have in common is found, and used to form two new signal strength reports with only these base stations:

Client k: $\lfloor (b_1, s_1^{(k)}), (b_2, s_2^{(k)}), \ldots, (b_{n_{k,l}}, s_{n_{k,l}}^{(k)}) \rfloor$
Client l: $\lfloor (b_1, s_1^{(l)}), (b_2, s_2^{(l)}), \ldots, (b_{n_{k,l}}, s_{n_{k,l}}^{(l)}) \rfloor$ Each report has $n_{k,l}$ ordered pairs in it, because this is how many base stations the two clients see in common. The signal strength difference feature is:

$$d_{k,l} = \sum_{i=1}^{n_{k,l}} \left[ (s_i^{(k)} - s_i^{(l)})^2 \right]$$

In words, for the base stations seen in common, the squared differences of the two clients' signal strengths are summed to make $d_{k,l}$. A large value of $d_{k,l}$ means the signal strengths are not similar and indicates the clients are likely not near each other.

Signal strength differences provide a good feature when the clients measure RSSI the same way. However, this is normally not the case when considering the different manufacturers and models of mobile client devices, and thus some normalization or similar techniques are useful. In one implementation, to handle such differences, a feature that is more robust comprises a ranking of the base stations seen in common. By way of example, suppose that the two clients can see four base stations in common, i.e. $n_{k,l}=4$, and that the two signal strength reports are:

Client k: [(b$_1$,30), (b$_2$,20), (b$_3$,35), (b$_4$,22)]
Client l: [(b$_1$,32), (b$_2$,19), (b$_3$,20), (b$_4$,25)]

After sorting each report by signal strength, then the two reports will be:

Client k: [(b$_2$,20), (b$_4$,22), (b$_1$,30), (b$_3$,35)]
Client l: [(b$_2$,19), (b$_3$,20), (b$_4$,25), (b$_1$,32)]

The "rank vector" of each client comprises the subscripts of the base stations taken in order of signal strength, i.e.

Client k: $r_k=(2,4,1,3)$
Client l: $r_l=(2,3,4,1)$

If the two rank vectors are identical, then the two clients ranked their common base stations identically, bolstering the likelihood that the clients are in proximity of each other. The difference between the two rank vectors can be computed in various standard ways, including Kendall's Tau and Spearman's Rho, both of which vary between −1 and 1, with greater values indicating more similar rank vectors. One embodiment chose Spearman's Rho, denoting it as $\rho_{k,l}$.

Given clients k and l and some or all of their proximity features $n_{k,l}$, $d_{k,l}$, and/or $\rho_{k,l}$, a decision needs to be made as to whether the two are in proximity. Both a manual and automatic method have been successfully employed to make such a decision.

In the manual method, the client machine's user manually adjusts thresholds on the proximity features to values that give the list of nearby users that seems correct. This gives the user the flexibility to shorten or lengthen the list depending on his or her own idea of proximity. Alternatively, these thresholds could be manually preset on the proximity server, which could make its own proximity inferences and return a list of nearby users in response to any client's query. Note that a more sophisticated approach provides a table of thresholds instead of just one. For instance, there can be a different threshold for $\rho_{k,l}$ for each value of $n_{k,l}$, meaning that the rank similarity threshold varies depending on how many access points are seen in common.

The automatic method is similar to the manual method except that the thresholds are determined automatically. In one instance of the present invention, the number of base stations in common ($n_{k,l}$) and the signal strength differences ($d_{k,l}$) were used as features. These values were recorded in a training phase as multiple users walked around with clients actively reporting signal strengths to the proximity server. Each user manually augmented each report with a list of nearby users. This resulted in a list of signal strength reports along with ground truth determinations of which pairs of reports were produced in proximity and which were not. Note that each report from a given client was paired with the reports from the other clients to expand the number of pairings used for training. Each of these pairs was tagged as either a proximity pair or a non-proximity pair, depending on the manually entered list of nearby users for that pair of reports. These pairs of reports were grouped by how many base stations were seen in common. From these groups, a normalized histogram was formed as estimates of p(near|n,d) and p(far|n,d), where n represents the number of base stations seen in common and d represents the signal strength difference as explained above.

Figure 3:
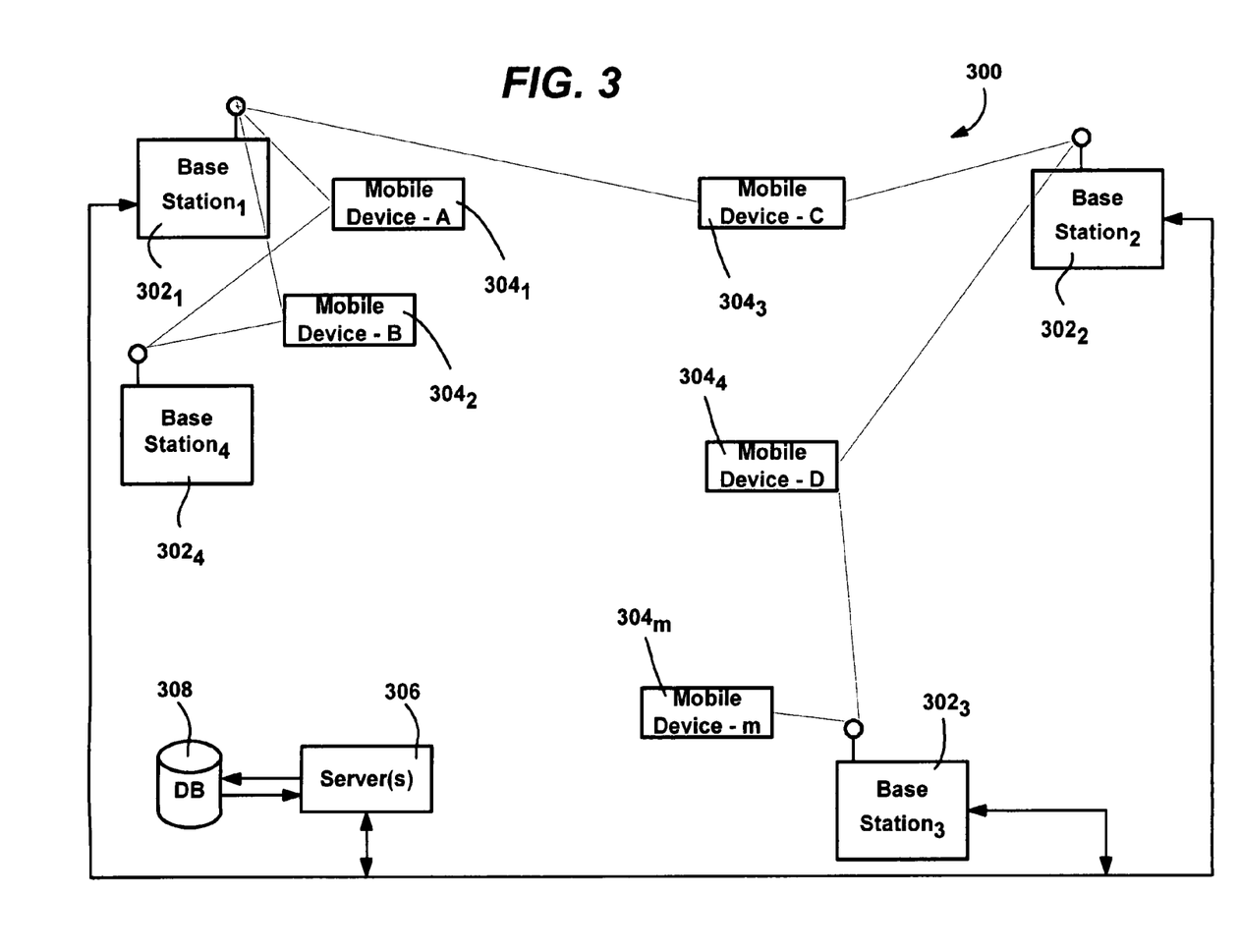
FIG. 3 is a block diagram generally representing another network, including a plurality of base stations having wireless connections to a plurality of network devices, configured to use signal strength data in accordance with an FIG. 4 is a block diagram generally representing a network including fixed and wireless devices, configured to use signal strength data in accordance with an aspect of the present invention.

The two states near and far represent the pair being in proximity or not, respectively. These two normalized histograms are taken as estimates of the probability of being in proximity or not given the number of base stations seen in common and the signal strength difference, as illustrated in FIG. 3. This training phase results in a pair of probability distributions, p(near|n,d) and p(far|n,d), for each possible n.

Automatic proximity inferences are made using the probability distributions created in the training phase. Using a pair of (possibly smoothed) reports from two clients k and l, the system computes $n_{k,l}$ and $d_{k,l}$ as explained above. If $p(near|n_{k,l},d_{k,l}) > p(far|n_{k,l},d_{k,l})$ then the two clients are deemed in proximity, otherwise they are deemed not in proximity. This computation can occur on either the client or the server.

People can only change their proximity relationships with limited frequency, e.g., at the limit, people can only move so fast. The system and method of the present invention optionally imposes a hysteresis on its proximity inferences that helps to smooth over small transients in proximity inferences. To this end, if a pair of clients is deemed to be in proximity, then there needs to be at least $q_{far}$ consecutive inferences of non-proximity to declare them non-proximal. Conversely, if the system has deemed two clients to be non-proximal, then there needs to be at least $q_{near}$ consecutive inferences of proximity to declare those clients to be in proximity. The values of $q_{far}$ and $q_{near}$ may be set experimentally, e.g., for one embodiment, the settings were $q_{far}=10$ and $q_{near}=5$.

It should be noted that not only can the present invention discover nearby people, but can also work to discover nearby resources such as printers. These devices would have to have a signal strength record sent into the server 206. This could come from a Wi-Fi card built into the device itself, or from someone standing near the device with a Wi-Fi equipped laptop.

Figure 4:
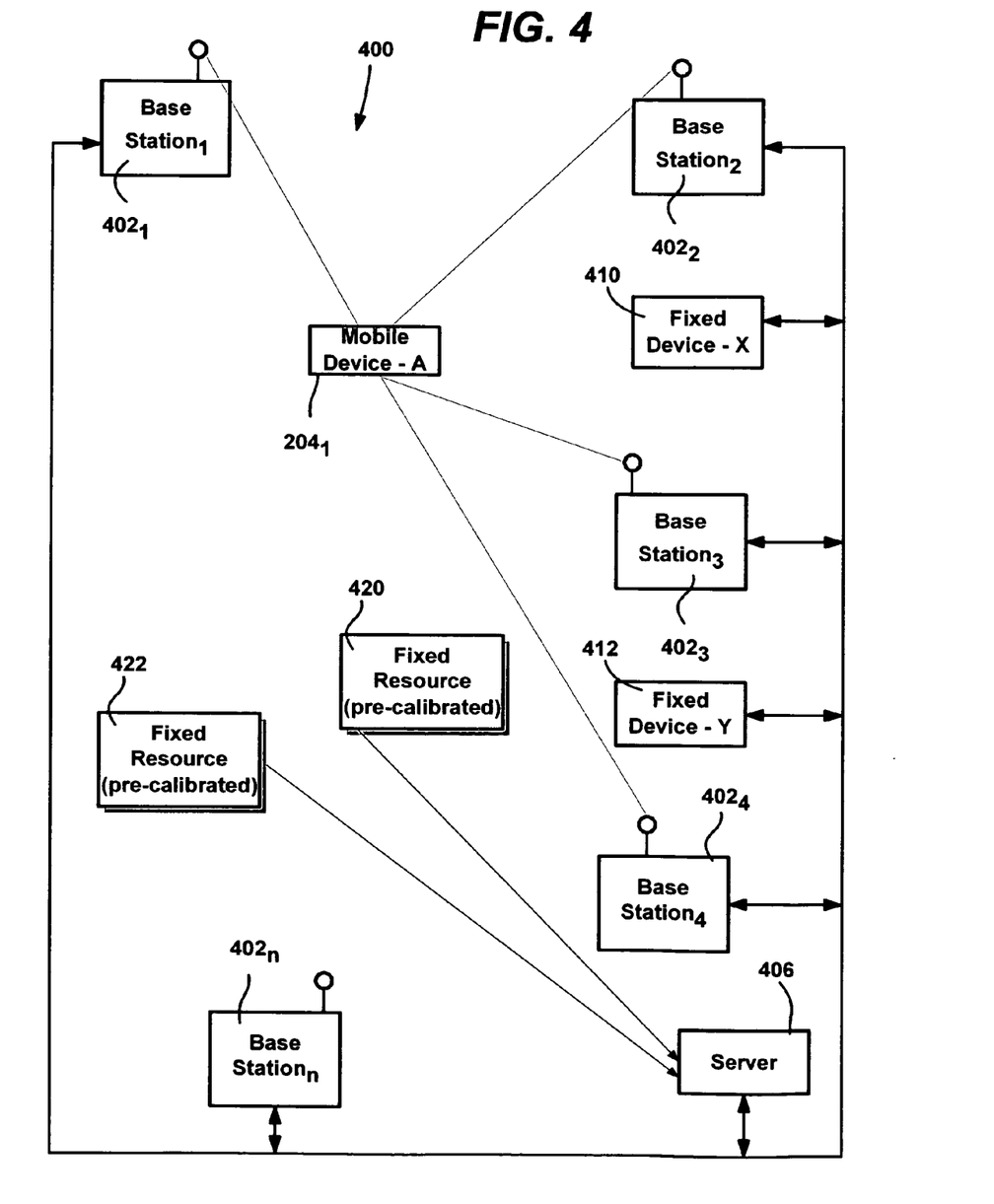

Moreover, the other devices that are discovered need not actually be mobile, but can, for example use simulated signal strengths. FIG. 4 shows an alternative implementation in which there are one or more fixed, wired devices in a network 400 (two are shown, fixed device—x and fixed device—y, labeled 410 and 412 in FIG. 4, respectively) that participate in proximity detection. In one alternative, each participating fixed device may be given a set of signal strengths relative to each base station, and thereafter reports (e.g., one time, similar to the above-described on-demand mode) the strengths to the server as if the fixed device was wireless. The server will then treat the fixed device as if it was a mobile device, although the operation can be somewhat different if desired, e.g., the server can report it as fixed. A mobile device positioned near the fixed resource may be used to obtain the readings, which may then be manually input or transferred to the fixed device in some manner, or reported from the mobile device to the server on behalf of the fixed resource. In this way, non-networked and non-electronic resources such as stairs, bathrooms, elevators or vending machines may be set to participate, as represented in FIG. 4 by the pre-calibrated fixed resources 420 and 422. Alternatively, the fixed device may obtain its own readings, such as by being configured with at least some signal strength detection capabilities. Once configured in its fixed location, the signal strengths of the fixed device may be left alone, or they may be updated, such as each time the fixed device connects to a wireless device to perform some functionality.

By way of example, consider a user of a mobile device looking for a printer, such as one of a number of printers made available to users and thus configured to participate in proximity detection. A mobile user can query the server for the nearest printer, (or other resources, such as a display monitor). In the example of FIG. 3, based on signal strengths the user of mobile device A would be informed that fixed device X was nearest at the present time, along with some information about fixed device X, such as the fact that it is a printer, a link to a device driver for that printer on the network, directions to the exact location of the printer, and so forth. Such information may be loaded from a database as with any other participating user, or may be provided to the mobile device A in some other way, such as from the server as part of the printer-location functionality.

Turning to an explanation of the operation of the present invention when used in an example proximity program 212 (FIG. 2) running on the network device (e.g., $204_1$), when one network device is deemed to be proximate another network device, information about the proximate device may be displayed via the program 212 to a user of the other device, and vice-versa. The database or the like, which may be the separate database 208 accessible through the server, an internal database on the device itself (e.g., the database 212 on device $204_1$), or some combination thereof, can be used to relate the device (that is deemed proximate) to data about its owner, or other appropriate information. For example, a person's name, biographical data an/or image may be available, and some or all of the data displayed.

Figure 5:
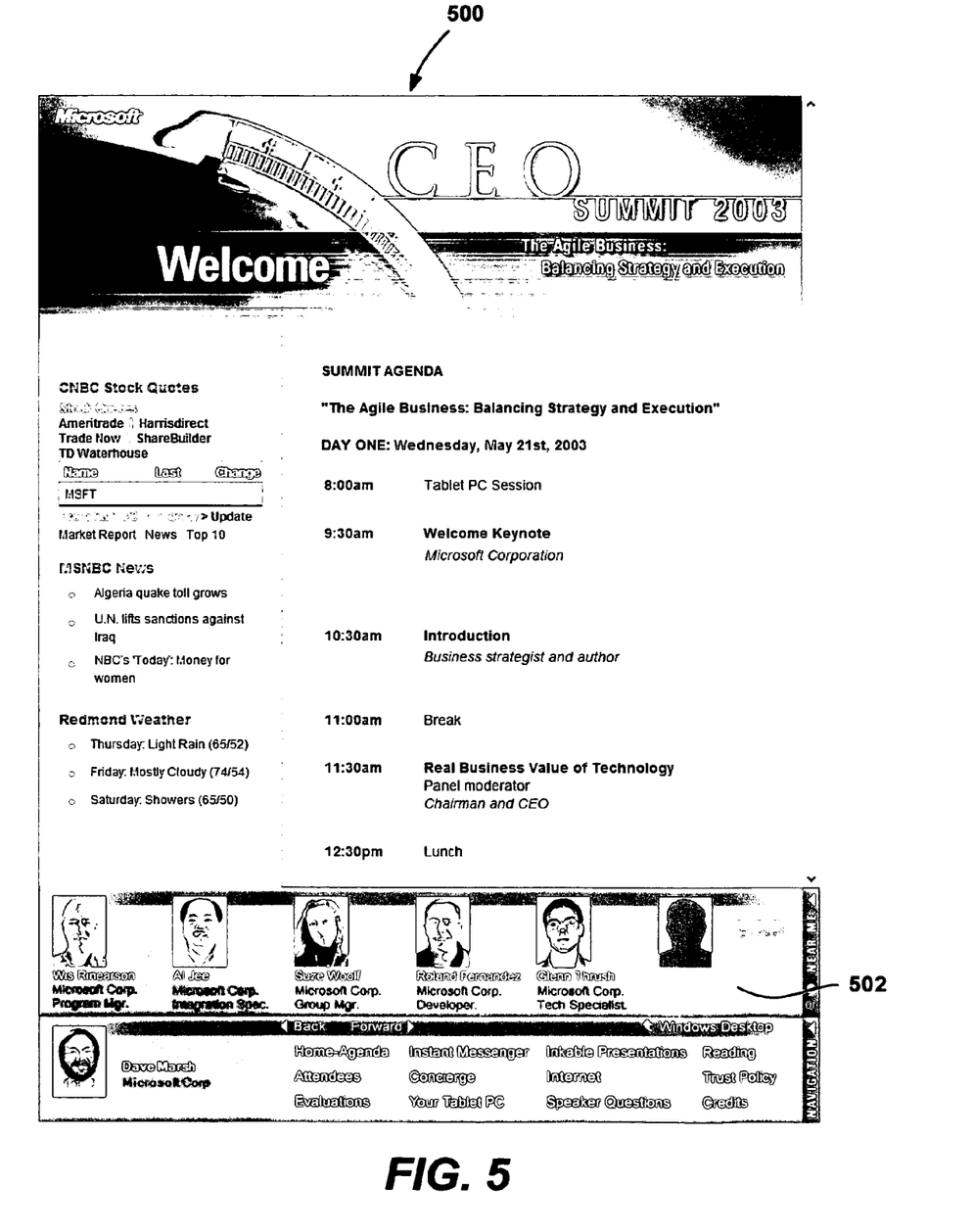
FIG. 5 is a representation of a program display showing one example of how signal strength data may be used to present a computer user with information based on proximity data of other network devices, in accordance with an aspect of the present invention.

FIG. 5 shows an example of a display 500 of one such program, in which the devices of a number of other users (five are shown) have been deemed proximate by the system and method of the present invention. The users may be ranked according to signal strength similarity, e.g., such that the user deemed likely closest is displayed leftmost and the least likely closest (but still deemed proximate) user is rightmost. In this example program, an image of the user of each proximate device appears in a "NEAR ME" region 502, with each image accompanied by a name, company data and job title. For example, an attendee of a conference may provide this information at registration, and/or a computer user may have locally preserved this information from a previous encounter, in which case such data can be displayed by associating it with a proximate device. As can be readily appreciated, virtually any type of information that a database can provide may be alternatively displayed, and additional information may be available, e.g., by clicking on the image or the accompanying data of a proximate user, more detailed biographical information may be made to appear on the screen.

Figure 6:
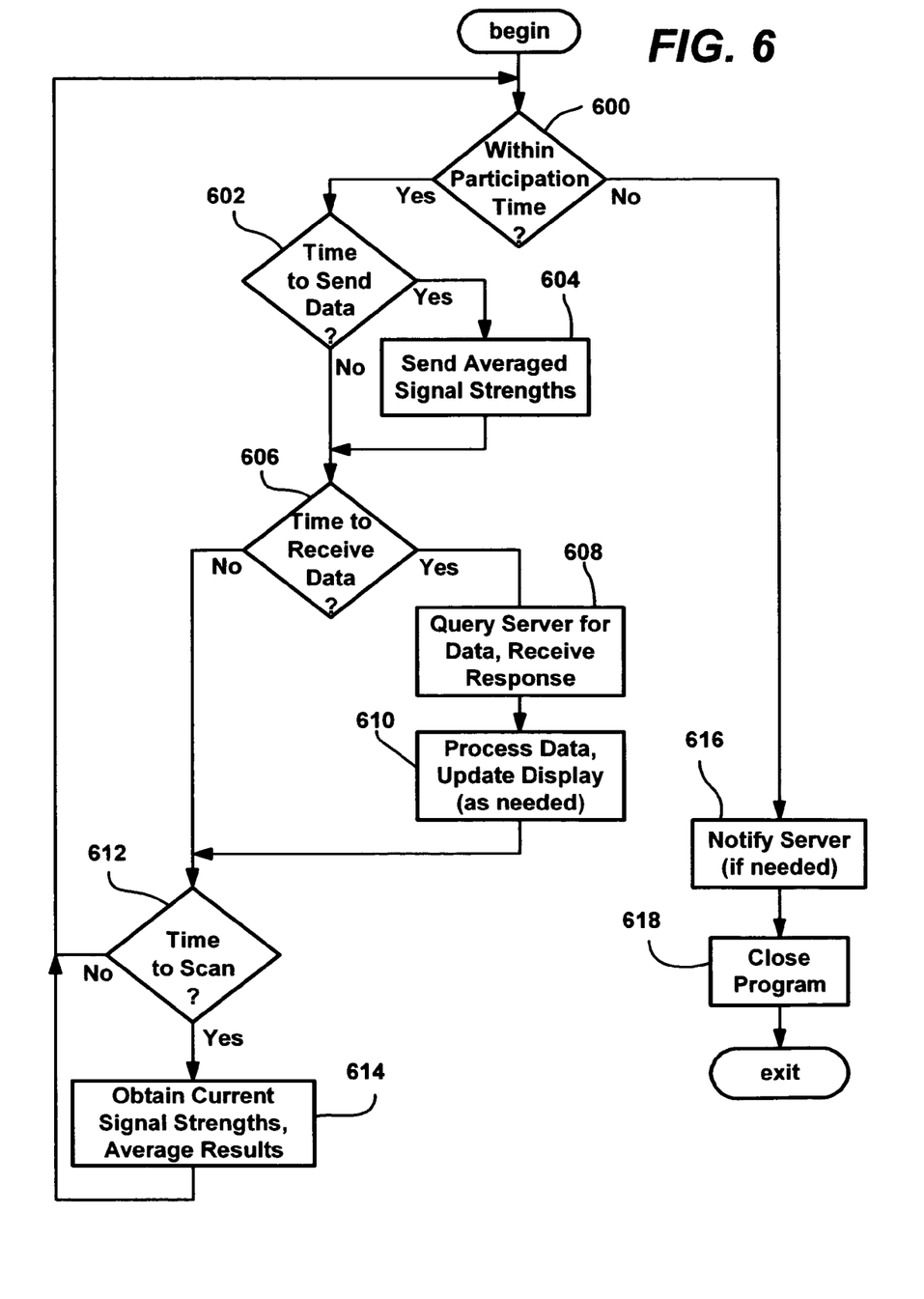
FIG. 6 is flow diagram generally representing operation of a client program to use signal strength data to present a computer user with information based on proximity data of other network devices, in accordance with an aspect of the present invention.

FIG. 6 is a flow diagram generally representing operation of a client device running such a program. Note that FIG. 6 is only intended to represent example functionality of such a program, and does not take into consideration possible concepts such as separate threads for sending, receiving and/or scanning, event driven operations and so forth. Further, FIG. 6 is shown in a client-server model in which the client queries the server for proximity data, although it is understood that the server can push the data and that clients rather than a server can communicate such information to each other in a peer-to-peer model.

In FIG. 6, step 600 represents the client program testing whether it should still be participating. If so, the program will report signal strengths, query for other clients' data, scan for base station signal strengths and so on as described above, otherwise the client program will end via steps 616 and 618 to avoid sending extraneous information on the network. Note that step 616 represents notifying the server of the end of client participation, which, for example would be helpful in an environment in which the client does not send time-out data to the server in advance, or if the client decides to end participation earlier than initially sent.

If still participating, step 600 branches to step 602 which represents the client determining whether it is time to send signal strength data to the server. Note that as described above, this transmission time may be a one-time, on-demand reporting, periodic reporting, reporting based on client signal strengths to base stations changing beyond some threshold (that would be indicative of movement), and other mechanisms, and/or any combination of such mechanisms. If time to send data, step 602 branches to step 604 to send the signal strengths, preferably smoothed (e.g., averaged) in some manner over time. Note that to average, scanning should be performed more frequently than reporting.

Step 606 tests whether it is time for the client to receive proximity data. If so, step 606 branches to step 608 which represents the query model in which the client receives a response from the server, such as a list of other clients that are deemed by the server to be close, or a set of signal strengths from which the client can compute proximity. Note that the former is somewhat advantageous in that only a small subset of client data needs to be transmitted by the server to each requesting client, thereby conserving bandwidth, however the latter is also somewhat advantageous in that clients rather than the server perform the calculations, thereby distributing the processing among the clients and reducing the computations needed by the server. Step 610 represents processing the data, whether computing the proximity based on strength, or using the list of clients to update the display as needed. Note that if the client computes the proximity from the signal strengths, ranks other clients as desired and so forth, then the client will need to later convert the data representing the proximate clients to human-useable data, such as by issuing a query to a database to display an image and text to update the display.

Step 612 represents the client device scanning for signal strengths of the base stations. As mentioned above, this may be more frequent than reporting, so that the current signal strengths may be averaged with previous ones scanned but not yet reported, as represented at step 614. As also described above, the server can perform is own smoothing functions. For example, the client can be configured to scan for signal strengths once per second, and report once every five seconds (thus smoothing the results of five scans), while the server may average over four reports from a client (every twenty seconds). As can be readily appreciated, these values are arbitrary and may be configured to fit any environment as appropriate. Step 614 loops back to step 600 in this example to continue operating until time expires or the user otherwise stops participating.

As can be seen from the foregoing detailed description, there is provided a method and system for detecting network devices or other resources that are proximate other network devices. Signal strengths (or other sensed conditions) are used in order to take advantage of existing infrastructure and hardware to provide network devices with the information needed to present meaningful proximity data to users of those devices.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and

What is claimed is:

1. In a network environment, a method for detecting a proximity of multiple client stations and identifying proximate client stations to a one or more of the client station, the method comprising:
    obtaining signal strength data of a first client station with respect to signals received by the first client station from at least one stationary base station wherein the first client station is mobile;
    obtaining signal strength data of other client stations with respect to signals received by the other client stations from the at least one stationary base station, the other client stations and the first client station being remote to the at least one stationary base station and wherein at least one of the other client stations is mobile;
    comparing the signal strength data of the first client station with the signal strength data of the other client stations;
    comparing the signal strength data of the first client station with simulated signal strength data of a non-networked, non-electronic, fixed resource;
    remote from the first client station and the other client stations, determining that the first client station is proximate one or more of the other client stations or the non-networked, non-electronic, fixed resource based on the signal strength data of the first client station, signal strength data of the other client stations to the at least one stationary base station, and simulated signal strength data of the non-networked, non-electronic, fixed resource; and
    sending to the first client station an identification of the one or more other client stations or of the non-networked, non-electronic, fixed resource determined to be proximate the first client station.

2. The method of claim 1 wherein obtaining signal strength data of the first client station comprises scanning at the first client station for radio signals at radio frequencies.

3. The method of claim 2 wherein scanning for radio signals comprises scanning a subset of channels.

4. The method of claim 2 wherein scanning for radio signals comprises performing a passive scan.

5. The method of claim 2 wherein scanning for radio signals comprises performing an active scan.

6. The method of claim 2 further comprising mathematically smoothing a plurality of signal strength data into a smoothed value.

7. The method of claim 1 wherein obtaining signal strength data of the first client station comprises receiving a report from the first client station at a server.

8. The method of claim 7 wherein the report is received on a regular basis from the first client station.

9. The method of claim 7 wherein the report is received as determined by the first client station.

10. The method of claim 1 wherein the other client stations comprise a second client station, and wherein obtaining signal strength data of the first client station comprises receiving a report at the second client station from the first client station.

11. The method of claim 10 wherein comparing the signal strength data comprises evaluating a number of base stations in common between the first client station and the one or more other client stations.

12. The method of claim 10 wherein the signal strength data of the first client station comprises a first set of signal strength values, each value associated with each base station of a plurality of base stations seen by the first client station, and wherein the signal strength data of other client stations comprises a second set of signal strength values, each value paired with each base station of a plurality of base stations seen by a second client station corresponding to the other client stations, and wherein comparing the signal strength data comprises evaluating signal strength values for base stations seen in common by the first device and the second client station.

13. The method of claim 12 wherein evaluating signal strength values for base stations seen in common comprises, ordering base stations seen in common by signal strength values into a first ordering for the first client station and a second ordering for the second client station, and determining similarity between the first ordering and the second ordering.

14. The method of claim 11 wherein a server determines that the one or more other client stations are proximate the first client station, and further comprising, the server returning proximity-related data to the first client station that corresponds to the one or more other client stations determined to be proximate the first client station.

15. The method of claim 14 further comprising, at the first client station, querying a database based on the proximity-related data for additional information corresponding to the one or more other client stations determined to be proximate the first client station.

16. The method of claim 15 wherein the one or more other client stations determined to be proximate the first client station comprises a second client station, and further comprising, receiving at the first client station additional information including biographical information corresponding to a user of the second client station.

17. The method of claim 10 wherein identifying to the first client station the one or more other client stations determined to be proximate the first client station comprises transmitting a list of at least one proximate client, including proximity-related data corresponding to the client, to the first client station.

18. The method of claim 14 wherein the one or more other client stations comprises a second client station, wherein a server receives signal strength data from the second client station, and wherein the server returning proximity-related data to the first client station that corresponds to the second client station comprises transmitting the signal strength data of the second client station to the first client station.

19. The method of claim 18 wherein determining that the first client station is proximate the second client station comprises processing the signal strength data of the second client station at the first client station.

20. The method of claim 1 wherein at least one of the one or more of the other client stations is fixed, and further comprising, providing a simulated signal strength for the fixed network resource.

21. One or more computer-readable media having stored thereon computer-executable instructions for performing the method of claim 1, wherein at least a portion of the computer-readable media is storage, non-communication-type media.

22. In a network environment, a system for obtaining at a client device information corresponding to other client devices located near the client device, the system comprising:
a client device having an output mechanism for providing information to a user of the client device wherein the client device is mobile, the client device further having a client program that detects signal strengths based on signals received by the client device from one or more base stations, the client program further being configured to:
report the detected signal strengths to a second network entity;
receive proximity-related data corresponding to the one or more separate client stations and one or more non-networked, non-electronic fixed resources from the second network entity, wherein at least one of the one or more separate client stations is mobile, wherein the proximity-related data relates to which of the one or more separate client stations and one or more fixed resources are proximate the client device as determined by the second network entity, wherein proximity of the one or more separate client stations is based on signal strengths of the one or more separate client stations detected based on signals received by the one or more separate client stations from the one or more base stations and proximity of the one or more fixed resources is based on simulated signal strengths of the one or more fixed resources, and wherein the client device and the one or more separate client stations are remote to the second network entity and the one or more base stations; and
present to the user of the client device information that corresponds to the proximity-related data of the one or more separate client stations and the one or more fixed resources on the output mechanism of the client device, based on proximity of the client device to the one or more separate client stations to the one or more base stations and proximity of the one or more fixed resources to the one or more base stations.

23. The system of claim 22 wherein the second network entity comprises a server.

24. The system of claim 22 wherein the second network entity comprises a different client device in the network.

25. The system of claim 22 wherein the proximity-related data comprises a list of other client stations that are proximate the client device.

26. The system of claim 22 wherein the client device is a first mobile client device and wherein the one or more separate client stations comprises at least one other mobile client device.

27. The system of claim 26 wherein the client program of the first client device processes the signal strengths of the one or more separate client stations to determine which other client stations are proximate the client device.

28. The system of claim 26 wherein the client program receives the proximity-related data from a server.

29. The method of claim 22 wherein the output mechanism comprises a display.

30. The system of claim 22 further comprising a database, wherein the client program accesses the database to present the information that corresponds to the proximity-related data on the output mechanism of the client device.

31. The system of claim 30 wherein the one or more separate client stations comprises another client device, and wherein the database returns biographical data corresponding to a user of the another client device for display on the client device.

32. The system of claim 22 wherein the one or more separate client stations comprises a plurality of stations and wherein one of the plurality of stations comprises a printer.

33. The system of claim 22 wherein the network comprises a wireless 802.11 network.

34. The method of claim 1 wherein the one or more non-networked, non-electronic fixed resources includes a fixed resource not having wireless capabilities, and wherein the signal strength data of the fixed resource not having wireless capabilities and determined to be proximate the first client station is a simulated wireless signal strength based on an actual wireless device and reported on behalf of the fixed resource.

35. In a wireless network having one or more base stations providing a wireless signal to a plurality of mobile client devices, a method for notifying users of one or more mobile client devices of the proximity of other users of mobile client devices, the method comprising:

obtaining signal strength data of a first mobile client device with respect to signals received by the first mobile client device from at least one stationary base station;

obtaining signal strength data of a second mobile client device with respect to signals received by the second mobile client device from the at least one stationary base station;

obtaining simulated signal strength data of a non-networked, non-electronic fixed resource participating in proximity detection relative to the first mobile client, wherein the simulated signal strength is an equivalent signal strength were the fixed resource a mobile client device, and is reported by a mobile device positioned near the fixed resource and on behalf of the fixed resource;

at the one or more base stations and remote from the plurality of mobile client devices:

comparing the signal strength data of the first mobile client device with the signal strength data of the second mobile client device and the simulated signal strength of the fixed resource;

determining that the first mobile client device is located at a geographic location that is proximate a geographic location of at least one of the second mobile client device or the fixed resource; and sending to the first mobile client device a notice that the first mobile client device is located near the at least one of the second mobile client device or the fixed resource, wherein when the notice is that the first mobile client device is located near the second mobile client device, the notice to the first mobile client device includes at least an identity of the user of the second mobile client device.

36. The method of claim 35, wherein when the notice is that the first mobile client device is located near the fixed resource, the notice to the first mobile device includes at least an identification of a type of resource that is the fixed resource.

* * * * *

UNITED STATES PATENT AND TRADEMARK OFFICE
CERTIFICATE OF CORRECTION

PATENT NO. : 7,936,872 B2
APPLICATION NO. : 10/677125
DATED : May 3, 2011
INVENTOR(S) : John C. Krumm et al.

Page 1 of 1

It is certified that error appears in the above-identified patent and that said Letters Patent is hereby corrected as shown below:

In column 3, line 36, after "an" insert -- aspect of the present invention; --.

In column 4, line 17, after "distributed" insert -- computing environment, program modules may be located in both --.

In column 15, line 67, after "and" insert -- scope of the invention. --.

In column 17, line 12, in Claim 14, delete "claim 11" and insert -- claim 1 --, therefor.

Signed and Sealed this
Twenty-sixth Day of July, 2011

David J. Kappos
*Director of the United States Patent and Trademark Office*